Aug. 18, 1959 J. W. HENDRY 2,899,710
PROCESS FOR MOLDING POLYTETRAFLUOROETHYLENE
Filed Feb. 14, 1957
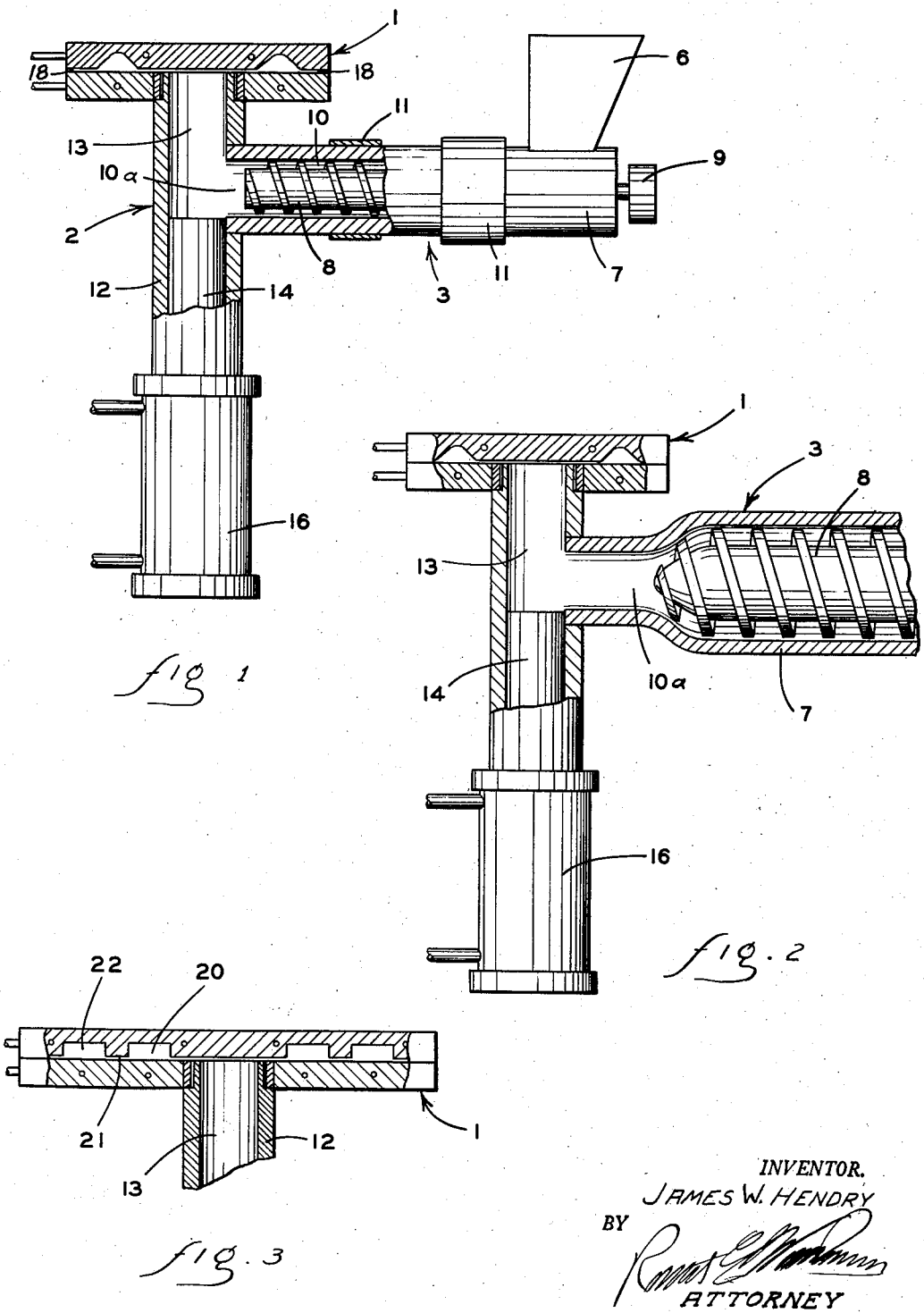
INVENTOR.
JAMES W. HENDRY
BY
ATTORNEY United States Patent Office 2,899,710
Patented Aug. 18, 1959

2,899,710

PROCESS FOR MOLDING POLYTETRAFLUORO-
ETHYLENE

James W. Hendry, Louisville, Ky., assignor to Tube
Turns Plastics, Inc., Louisville, Ky., a corporation of
Delaware Application February 14, 1957, Serial No. 640,255

11 Claims. (Cl. 18—55)

This invention relates to a method for molding polytetrafluoroethylene and, particularly, to a method of effecting such molding by an injection-type operation. This application is a continuation-in-part of my co-pending application Serial No. 420,293, filed April 1, 1954, now abandoned.

As used herein, the terms "polytetrafluoroethylene" and "tetrafluoroethylene resins" refer to the group of synthetic organic plastic materials of which representative and illustrative examples are manufactured and sold by E. I. du Pont de Nemours and Co., under the trademark "Teflon."

Although polytetrafluoroethylene has been used industrially for a number of years and has been the subject of a great deal of investigation, no method has thus far been developed, insofar as I am aware, by which polytetrafluoroethylene can be satisfactorily molded by processes which are, in general, of the injection type. Rather, for a long time prior to the present invention, it has been accepted in the trade that this material is not capable of being molded by injection methods. Thus, the economy and high production benefits of such molding technique have not been available for polytetrafluoroethylene.

Accordingly, a principal object of this invention has been to provide a method for molding polytetrafluoroethylene by an injection-type operation.

A further object of this invention has been to provide a method, as aforesaid, which is adaptable to being carried out in presently available equipment, with only minor modifications, if any.

A further object of this invention has been to provide a method, as aforesaid, which is convenient in operation and accurate in results.

A further object of this invention has been to provide a method, as aforesaid, which will produce molded parts of high quality.

A further object of this invention has been to provide a method, as aforesaid, which can be carried out by personnel having no more than the normal skill commonly encountered in injection molding plants.

Other objects and purposes of this invention will be apparent to persons acquainted with methods of this general type upon reading the following specification and inspecting the accompanying drawings, in which:

Figure 1 is a schematic view partially in central section, of one machine capable of practicing the invention.

Figure 2 is a schematic view partially in central section of another machine capable of practicing the invention.

Figure 3 is a fragmentary view in section of a part of a machine capable of performing a modification of the process of the invention.

Polytetrafluoroethylene is commercially furnished in a powder or fine granular form, wherein the several particles each comprise a nodule, or head, associated with an elongated, filament-like appendage, or tail, and when the material is heated to a proper temperature, above about 620 degrees F. at atmospheric pressure, it is converted into a gel-like, amorphous mass.

In the past, attempts to mold this material in a conventional manner have resulted in separation of the material into small pieces after release of pressure on the material, which pieces did not subsequently weld together. It is believed that this was due to the material achieving a gel condition either prior to entering the final mold cavity or in the runners leading to said cavity.

The present invention provides a process for molding polytetrafluoroethylene, comprising: heating and agitating a quantity of granular polytetrafluoroethylene until it attains throughout a substantially uniform elevated temperature, usually in excess of about 580 degrees F., but well below the atmospheric pressure gelation temperature; preferably at this point applying sufficient pressure to said material to compact same into a dense mass, i.e., a body free of any appreciable voids; subsequently applying sufficient pressure to said mass to move same into the mold and to fill the contours thereof without permitting the temperature to rise sufficiently to convert said mass into a gel state; after the filling of the mold and while maintaining high pressure on the material, heating the material to a temperature sufficient to convert same into a gel state; diminishing the pressure on the material and reducing the temperature below that at which the material will remain in a gel condition at the diminished pressure; holding the pressure at said diminished level until said material has set; and finally releasing said pressure and removing the molded part from the mold.

The drawings disclose several types of apparatus by which the method of the invention may be practiced. In Figure 1, there is shown a mold 1, an injection unit 2 and a preplasticizing unit 3. The preplasticizing unit comprises a hopper 6 mounted on a tube 7, which tube is normally horizontally positioned, and in whose chamber 10 there is rotatably mounted an agitating and conveying screw 8, said screw preferably terminating materially short of the discharge port of the preplasticizing unit. The screw is rotated by any convenient means 9 at a closely controllable speed. Any conventional source of externally applied heat, such as heating bands 11, is utilized to apply the major amount of the necessary heat to the preplasticizing unit. However, some heating of the material is obtained by the frictional heat developed within the material itself as a result of the mechanical work done thereon by the screw.

The preplasticizing unit 3 is connected to the injection unit 2. The injection unit comprises an injection cylinder 12, defining an injection chamber 13 of a diameter preferably not greater than the diameter of the preplasticizing chamber 10. A ram 14 is slidably arranged within said chamber and is operated by a pressure fluid cylinder 16. The injection chamber is connected directly, and without diminution in cross-section, to the mold 1, and said mold is either provided with a sprue opening of a diameter equal to that of the injection cylinder or it receives said injection cylinder all of the way to its parting line, so that said injection cylinder will discharge directly into the mold runners.

Thus, the granular polytetrafluoroethylene is placed into the hopper 6, and is fed thence to the screw 8, by which it is agitated and heated so as thereby to raise it to a substantially uniform temperature above about 580 degrees F. but below the atmospheric pressure gelation temperature, an optimum temperature being about 600 degrees F. At this temperature, the material in ungelled condition is moved first into the compacting zone 10a of the preplasticizing unit, which zone, in Figure 1, is of the same diameter as the zone occupied by the screw. In Figure 2, the compacting zone is of a lesser diameter, to effect a more intense compacting. Thus, after the above mentioned heating, the material is formed into a compacted rod, which is then moved into the ram chamber without the formation of appreciable voids therein. Pressure is now placed upon the ram 14 and thereby applied to the material, which causes the material to move to the mold, through the runners, and into the mold cavity. The mechanical work applied to the material, particularly as it goes through the runners, raises the temperature of such material further. However, the rate of such motion is controlled sufficiently carefully with respect to the size of the mold, sprue opening and runners that the temperature of the material is never permitted to exceed the temperature at which it will be converted into a gel state under the injection pressure employed in the preferred practice of the invention, so that said material becomes packed in the mold cavity in a condition which, if the material were not further heated, would not result in a satisfactory molded article.

When the mold is substantially full, the material is then further heated to a temperature in excess of 690 degrees F., as about 710 degrees F. or 715 degrees F. The pressure on the material is maintained throughout this operation at a value in excess of 30,000 p.s.i. and, in one successful operation, the pressure was held at approximately 37,000 p.s.i. Under such pressure, the material then assumes the contour of the mold cavity and will start to extrude through the mold vents 18. When this is observed, it is known that the material has completely filled the mold whereupon the pressure is diminished to a lower level which, although still substantial, is low enough to terminate such extrusion through the vents of the mold. The heating also is reduced, or terminated, and the material is cooled to a temperature at which setting of the material will take place. In one specific, successful operation, this last named temperature was about 650 degrees F., and the pressure was reduced to about 4,000 p.s.i. It is important to maintain sufficient pressure on the material while it is cooling to take up shrinkage until the material is rigidified. When the material has rigidified, the pressure can be completely released, and the mold opened and the product removed.

It is important, in carrying out the present process, that each quantity or charge of material discharged from the preplasticizing unit into the ram chamber must be expelled from the ram chamber, by being utilized in the molding operation or otherwise, before a new quantity or charge of material is supplied from the preplasticizing unit to the ram chamber. Thus, it will not be desirable to use a tapered nozzle, a torpedo, breaker plates, or any other device commonly used at the present in conventional injection molding processes, by which a quantity of molding material will remain in the injection chamber after the completion of a given molding cycle. Instead, the entire quantity discharged from the preplasticizing unit in any given cycle should be conducted through the machine and removed before a new quantity of material is supplied to the ram chamber.

While the temperatures and pressures above set forth are believed to be the optimum for handling polytetrafluoroethylene of the kind and type now commercially available, it will be recognized that certain modifications may be made in this material, which may result in modifications of the herein stated temperatures. Accordingly, such temperatures are to be taken as examples, only, of the temperatures now used with the kinds of polytetrafluoroethylene now commercially available, and said temperatures are subject to modification if the material itself is modified. Thus, when the material is preliminarily compacted, as hereinbefore described in connection with the preferred embodiment of the invention, such compacting is effected without permitting the material to convert into the gel state, regardless of the temperature at which such conversion of the particular material concerned in a given case takes place, and, in such compacted condition, the material is then moved into the mold. As the material is moved into the mold, its temperature preferably is raised to a level as high as possible, short of that which will cause the material to gel, in order to facilitate moving the material into the mold and reduce the amount of subsequent heating of the material after it is in the mold. After the material is in the mold, the heating is carried past whatever temperature is necessary to produce the gel state, which temperature may vary with different operating conditions and different kinds of polytetrafluoroethylene employed.

Further, once the material is brought to a high temperature, above about 690 degrees F., while under the high pressure imposed thereon, it can be further moved at much reduced pressures through other orifices and into other mold cavities. Thus, as illustrated in Figure 3, the material may be, and has been, moved into a first cavity 20 under high pressure (i.e., 30,000 p.s.i.), formed therein into a more easily movable condition, and then urged under materially lesser pressure (as about 7,000 p.s.i) through an orifice 21 into a second cavity 22. In order to constantly hold pressure on the material, the second cavity may be filled with a viscous fluid substance, and this substance will be expelled by the polytetrafluoroethylene material as it enters the second cavity. Upon further reduction in pressure and cooling of the polytetrafluoroethylene material in the second cavity, a well-formed and well-finished product is secured.

While I have utilized certain apparatus to illustrate the practice of the invention, it will be recognized that such apparatus is by way of illustration and that a variety of other devices are known by which the steps described can be carried out. Accordingly, it should be clearly understood that, while the process can be conveniently employed with the apparatus disclosed, the practice of the process is not so limited.

While specific steps and specific operating data have been set forth for illustrating the process, it will be understood that numerous variations may be made from the specific details herein mentioned, that such variations will be apparent to persons acquainted with the material here in question and injection molding processes in general and, accordingly, that such variations should be considered within the scope of the hereinafter appended claims, excepting where said claims by their own terms expressly require otherwise.

I claim:

1. In a process for molding polytetrafluoroethylene, the steps comprising: heating and agitating granular tetrafluoroethylene until it attains a substantially uniform temperature in excess of 580 degrees F.; applying sufficient pressure to said material to form same into a dense mass, but without further raising its temperature; subsequently applying sufficient pressure to said mass to move same into a mold and to fill said mold, but without permitting the temperature to rise sufficiently to convert said mass into a gel state; after the filling of said mold, heating said material sufficiently to convert same into a gel state and simultaneously holding a pressure in excess of at least about 30,000 p.s.i. thereon to cause said mass to assume the contour of the mold cavity, and holding said pressure thereon until said mass has assumed the contour of said mold cavity; diminishing the temperature to a level below that at which material will remain in a gel state; diminishing said pressure sufficiently to terminate extrusion of material through the mold vents and holding said diminished pressure until said material has set; releasing said pressure and removing the molded part from the mold.

2. The process of molding polytetrafluoroethylene, comprising the steps: heating and agitating granular tetrafluoroethylene until it attains a substantially uniform temperature of approximately 600 degrees F.; simultaneously applying sufficient pressure to said material to form same into a dense mass, but without further raising its temperature; subsequently applying sufficient additional pressure to said mass to move same into a mold and to fill said mold; simultaneously permitting the temperature to rise to a point as close as possible to 690 degrees F., but not sufficient to convert said mass into a gel state; after the filling of said mold, heating said material to a temperature of between about 690 degrees F. and about 715 degrees F., and simultaneously holding pressure thereon in excess of 30,000 p.s.i. until said mass has assumed the contour of the mold cavity; diminishing the temperature of said material to about 650 degrees F.; diminishing said pressure sufficiently to terminate extrusion of said material through the mold vents and holding said pressure until said material rigidifies; releasing said pressure and removing the molded part from the mold.

3. The process of molding polytetrafluoroethylene, comprising the steps: heating and agitating granular tetrafluoroethylene until it attains a substantially uniform temperature of approximately 600 degrees F.; simultaneously applying sufficient pressure to said material to form same into a dense mass, but without further raising its temperature; subsequently applying sufficient additional pressure to said mass to move same into a mold and to fill said mold; simultaneously permitting the temperature to rise to a point as close as possible to that at which it will transform into a gel state, but not sufficient to convert said mass into a gel state; after the filling of said mold, heating said material to a temperature of between about 690 degrees F. and about 715 degrees F. and simultaneously holding pressure of about 37,000 p.s.i. thereon until said mass has assumed the contour of the mold cavity; diminishing the temperature of said material to about 650 degrees F.; and simultaneously diminishing said pressure sufficiently to terminate extrusion of material through the mold vents and holding said pressure until said material rigidifies; releasing said pressure and removing the molded part from the mold.

4. In a process for molding polytetrafluoroethylene, the steps comprising: heating and agitating granular tetrafluoroethylene until it attains a substantially uniform temperature in excess of 580 degrees F.; applying sufficient pressure to said material to form same into a dense mass; subsequently applying sufficient pressure to said mass to move same into a mold and to fill said mold, but without permitting the temperature to rise sufficiently to convert said mass into a gel state; after the filling of said mold, heating said material sufficiently to convert same into a gel state and simultaneously holding a pressure in excess of at least about 30,000 p.s.i. thereon to cause said mass to assume the contour of the mold cavity, and holding said pressure thereon until said mass has assumed the contour of said mold cavity; diminishing the pressure on said material and reducing the temperature thereafter to a level below that at which material will remain in a gel state; holding said pressure at said diminshed level until said material has set; releasing said pressure and removing the molded part from the mold.

5. The process of molding polytetrafluoroethylene, comprising the steps: heating and agitating granular tetrafluoroethylene until it attains a substantially uniform temperature of approximately 600 degrees F.; simultaneously applying sufficient pressure to said material to form same into a dense mass; subsequently applying sufficient additional pressure to said mass to move same into a mold and to fill said mold; simultaneously permitting the temperature to rise to a point as close as possible to 690 degrees F., but not sufficient to convert said mass into a gel state; after the filling of said mold, heating said material to a temperature of between about 690 degrees F. and about 715 degrees F., and simultaneously holding pressure thereon in excess of 30,000 p.s.i. until said mass has assumed the contour of the mold cavity; diminishing the pressure on said material and reducing the temperature of said material to about 650 degrees F.; holding said pressure at said diminshed level until said material rigidifies; releasing said pressure and removing the molded part from the mold.

6. The process of molding polytetrafluoroethylene, comprising the steps: heating and agitating granular tetrafluoroethylene until it attains a substantially uniform temperature of approximately 600 degrees F.; simultaneously applying sufficient pressuer to said material to form same into a dense mass; subsequently applying sufficient additional pressure to said mass to move same into a mold and to fill said mold; simultaneously permitting the temperature to rise to a point as close as possible to that at which it will transform into a gel state, but not sufficient to convert said mass into a gel state; after the filling of said mold, heating said material to a temperature of between about 690 degrees F. and about 715 degrees F. and simultaneously holding pressure of about 37,000 p.s.i. thereon until said mass has assumed the contour of the mold cavity; diminishing the pressure on said material and reducing the temperature of said material to about 650 degrees F. holding said pressure at said diminshed level until said material rigidifies; releasing said pressure and removing the molded part from the mold.

7. In a process for molding polytetrafluoroethylene, the steps comprising: heating and agitating a quantity of granular polytetrafluoroethylene until it attains throughout a substantially uniform temperature in excess of about 580 degrees F. but substantially below the gelation temperature; applying sufficient pressure to said material to compact same into a dense charge; subsequently applying sufficient pressure to said charge to move same into a mold and to fill the mold, without permitting the temperature of the charge to rise sufficiently to convert said charge into a gel condition; after the filling of said mold, heating said material to a temperature sufficient to convert said charge into a gel condition; diminishing the pressure on said material and reducing the temperature of the material to a level below that at which the material will remain in the gel condition; holding the pressure at said diminshed level until said material has set; releasing said pressure and removing the molded part from the mold.

8. The process of molding polytetrafluoroethylene, comprising the steps: heating and agitating a quantity of granular polytetrafluoroethylene until it attains throughout a substantially uniform temperature in excess of about 580 degrees F. but substantially below the gelation temperature; applying sufficient pressure to said material to compact same into a dense charge; subsequently applying sufficient pressure to said charge to move same into a mold and to fill said mold without permitting said charge to reach a gel condition; after filling said mold, heating said material to a temperature of between about 690 degrees F. and about 715 degrees F. and simultaneously applying a pressure in excess of 30,000 p.s.i. thereon; diminishing the pressure on said material and reducing the temperature of said material to a temperature not exceeding about 650 degrees F.; holding a reduced pressure on said material until said material rigidifies; releasing said pressure and removing the molded part from the mold.

9. The process of molding polytetrafluoroethylene, comprising the steps: heating and agitating a quantity of granular polytetrafluoroethylene until it attains throughout a substantially uniform temperature in excess of about 580 degrees F. but substantially below the gelation temperature; applying sufficient pressure to said material to compact same into a dense charge; subsequently applying sufficient pressure to said charge to move same into a mold and fill said mold while heating said material to a temperature as close as possible to 690 degrees F., but without permitting said charge to reach a gel condition; after filling said mold, heating said material to a temperature of between about 690 degrees F. and about 715 degrees F. and simultaneously applying a pressure in excess of 30,000 p.s.i. thereon; diminishing the pressure on said material and reducing the temperature of said material to a temperature not exceeding about 650 degrees F.; holding a reduced pressure on said material until said material rigidifies; releasing said pressure and removing the molded part from the mold.

10. The process of molding polytetrafluoroethylene, comprising the steps: heating and agitating a quantity of granular polytetrafluoroethylene until it attains throughout a substantially uniform temperature in excess of about 580 degrees F. but substantially below the gelation temperature; applying sufficient pressure to said material to form same into a dense charge; subsequently applying sufficient pressure to said charge to move same into a mold and to fill said mold while heating said material to a temperature as close as possible to 690 degrees F., but without permitting said charge to reach a gel condition; after filling said mold, heating said material to a temperature of between about 690 degrees F. and about 715 degrees F. and simultaneously applying a pressure thereon until said charge has assumed the contour of the mold; diminishing the pressure on said material and reducing the temperature of said material to a temperature not exceeding about 650 degrees F.; holding a reduced pressure on said material until said material rigidifies; releasing said pressure and removing the molded part from the mold.

11. In a process for molding polytetrafluoroethylene, the steps comprising: progressively heating and agitating a continuously advancing body of granular polytetrafluoroethylene until it attains throughout a given cross-section thereof a substantially uniform temperature in excess of about 580 degrees F. but substantially below the gelation temperature; applying sufficient pressure to successive increments of the thus heated advancing material to compact the same; periodically transferring individual ones of such compacted increments into an injection chamber so that each of said increments constitutes an individual measured charge in said chamber; applying sufficient pressure to said charge to move same from said chamber into a mold and to fill said mold, without permitting the temperature of the charge to rise sufficiently to convert it into a gel condition; after the filling of said mold with such charge, heating the charge sufficiently to convert the same into a gel condition and simultaneously applying sufficient pressure thereon to force the charge to conform to the shape of the mold; diminishing the pressure on the charge and reducing the temperature of the charge to a level below that at which it will remain in the gel condition; holding the pressure at said diminished level until the charge has set; releasing said pressure and removing the entirety of the charge from the mold.

References Cited in the file of this patent

UNITED STATES PATENTS

| 2,359,013 | Tucker | Sept. 26, 1944 |
| 2,456,621 | Cheney | Dec. 21, 1948 |
| 2,617,152 | Rubin | Nov. 11, 1952 |
| 2,705,342 | Hendry | Apr. 5, 1955 |
| 2,770,842 | Hahn et al. | Nov. 20, 1956 |